United States Patent
Zhou et al.

(10) Patent No.: US 10,524,234 B2
(45) Date of Patent: Dec. 31, 2019

(54) UPLINK DATA PACKET TRANSMISSION METHOD, TERMINAL DEVICE, BASE STATION, AND COMMUNICATIONS SYSTEM

(71) Applicant: Huawei Technologies Co., Ltd., Shenzhen (CN)

(72) Inventors: Kaijie Zhou, Shenzhen (CN); Tianle Deng, Shanghai (CN); Xinzheng Wang, Shanghai (CN); Xingxing Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 34 days.

(21) Appl. No.: 15/869,913

(22) Filed: Jan. 12, 2018

(65) Prior Publication Data
US 2018/0139729 A1    May 17, 2018

Related U.S. Application Data

(63) Continuation of application No. PCT/CN2015/084362, filed on Jul. 17, 2015.

(51) Int. Cl.
*H04W 72/04* (2009.01)
*H04W 48/16* (2009.01)
(Continued)

(52) U.S. Cl.
CPC ......... *H04W 72/04* (2013.01); *H04L 27/2605* (2013.01); *H04W 48/16* (2013.01);
(Continued)

(58) Field of Classification Search
CPC . H04W 72/04; H04W 48/16; H04W 56/0005; H04W 72/042; H04W 72/0413;
(Continued)

(56) References Cited

U.S. PATENT DOCUMENTS

| | | |
|---|---|---|
| 2008/0310519 A1 | 12/2008 | Seyedi-Esfahani et al. |
| 2011/0064038 A1 | 3/2011 | Kuo |

(Continued)

FOREIGN PATENT DOCUMENTS

| | | |
|---|---|---|
| CN | 101326752 A | 12/2008 |
| CN | 103348746 A | 10/2013 |

(Continued)

OTHER PUBLICATIONS

"Non Synchronized Random Access Design for High Doppler Conditions," 3GPP TSG RAN WG1 #47, Riga, Latvia R1-063214, 3rd Generation Partnership Project, Valbonne, France (Nov. 6-10, 2006).

(Continued)

*Primary Examiner* — Paul H Masur
*Assistant Examiner* — Michael K Phillips
(74) *Attorney, Agent, or Firm* — Leydig, Voit & Mayer, Ltd.

(57) ABSTRACT

The present disclosure provides an uplink data packet transmission method. The method includes: determining, by a terminal device, a CP length of a first uplink data frame; if the terminal device is in a state of out of uplink synchronization with a base station and in an RRC connected state, or is in an RRC idle state, generating the first uplink data frame for an uplink data packet according to the CP length and sending the first uplink data frame to the base station. The CP length is greater than a CP length of an uplink data frame sent by a terminal device that is in a state of uplink synchronization and in an RRC connected state. Therefore, signaling procedures such as random access and uplink synchronization can be omitted, so that the terminal device can directly send the uplink data packet by performing signaling exchange once.

19 Claims, 8 Drawing Sheets

(51) Int. Cl.
*H04L 27/26* (2006.01)
*H04W 56/00* (2009.01)

(52) U.S. Cl.
CPC ....... *H04W 56/0005* (2013.01); *Y02D 70/122* (2018.01); *Y02D 70/1222* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01)

(58) Field of Classification Search
CPC ......... H04W 74/0833; H04W 72/0446; H04W 72/048; H04W 76/10; H04W 76/27; H04W 28/18; H04L 27/2605; H04L 27/2607; H04L 5/0053; Y02D 70/00; Y02D 70/122; Y02D 70/1262; Y02D 70/1222; Y02D 70/1242; Y02D 70/142; Y02D 70/1264; Y02D 70/21; Y02D 70/146
See application file for complete search history.

(56) References Cited

U.S. PATENT DOCUMENTS

| 2012/0039182 | A1* | 2/2012 | Zhou | H04L 1/1893 370/241 |
|---|---|---|---|---|
| 2014/0044108 | A1 | 2/2014 | Earnshaw et al. | |
| 2015/0117363 | A1 | 4/2015 | Rong et al. | |
| 2015/0146631 | A1 | 5/2015 | Kim et al. | |
| 2015/0282132 | A1 | 10/2015 | Kim et al. | |
| 2015/0358801 | A1* | 12/2015 | Seo | H04W 8/005 370/329 |
| 2015/0365218 | A1* | 12/2015 | Yang | H04L 5/0044 370/329 |
| 2016/0309455 | A1* | 10/2016 | Wu | H04W 72/0406 |
| 2017/0135134 | A1* | 5/2017 | Rune | H04W 74/04 |
| 2017/0238301 | A1* | 8/2017 | Nakazawa | H04J 11/00 370/329 |
| 2017/0245307 | A1* | 8/2017 | Liu | H04W 74/00 |
| 2018/0027595 | A1* | 1/2018 | Wang | H04L 12/413 370/329 |
| 2018/0115430 | A1* | 4/2018 | Seo | H04W 88/02 |

FOREIGN PATENT DOCUMENTS

| WO | 2014058221 A2 | 4/2014 |
|---|---|---|
| WO | 2014097223 A2 | 6/2014 |

OTHER PUBLICATIONS

"Considerations on timing for D2D," 3GPP TSG RAN WG1 Meeting #75, San Francisco, USA, R1-135047, 3rd Generation Partnership Project, Valbonne, France (Nov. 11-15, 2013).

"E-UTRA TDD Random Access," 3GPP TSG RAN1 TDD Adhoc, Beijing, China, R1-071856, 3rd Generation Partnership Project, Valbonne, France (Apr. 17-20, 2007).

"Considerations on timing for D2D", 3GPP TSG RAN WG1 Meeting #75 San Francisco, USA, 3rd Generation Partnership Project, Valbonne, France (Nov. 11-15, 2013).

* cited by examiner

FIG. 1A – Prior Art

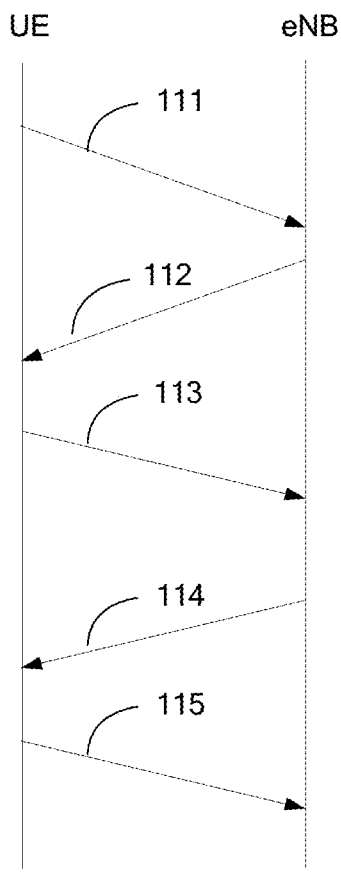
FIG. 1B – Prior Art
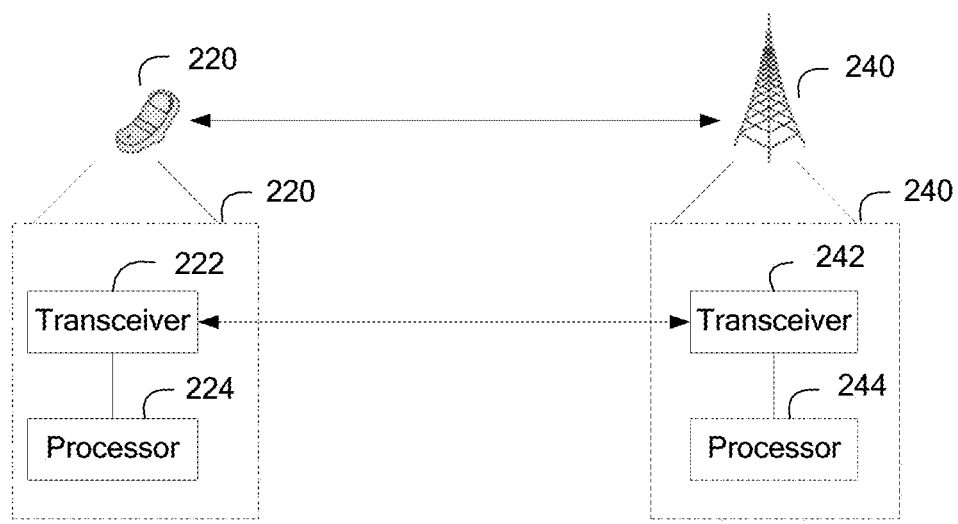
FIG. 2

UPLINK DATA PACKET TRANSMISSION METHOD, TERMINAL DEVICE, BASE STATION, AND COMMUNICATIONS SYSTEM

CROSS-REFERENCE TO RELATED APPLICATIONS

This application is a continuation of International Application No. PCT/CN2015/084362, filed on Jul. 17, 2015, the disclosure of which is hereby incorporated by reference in its entirety.

TECHNICAL FIELD

Embodiments of the present disclosure relate to the field of communications technologies, and specifically, to an uplink data packet transmission method, a terminal device, a base station, and a communications system.

BACKGROUND

A heartbeat mechanism is widely used on Internet applications on a mobile phone. For example, the heartbeat mechanism is used on an Android native application, QQ, microblog, and WeChat. The mobile phone regularly sends short information (which may be referred to as heartbeat information or a heartbeat package) to an application server. With the heartbeat mechanism for the Internet applications, the application server may push information related to a mobile phone user in a timely manner, such as a short message, an image, or a voice in WeChat. Once the application server cannot receive heartbeat information of the mobile phone, the server may take over a service of the mobile phone, so as to avoid service stagnation. In some scenarios, a service data packet of an Internet application has a relatively small throughput. The same is true for an answer (ACK) message at an uplink Transmission Control Protocol (TCP) layer.

In addition, as communications technologies develop, communication is no longer performed only between human and human, and machine to machine (M2M) communication (machine type communication, MTC) becomes increasingly popular. It is predicted that 50 billion machines will be connected to each other by using the communications technologies by 2020. In the MTC, software and hardware are combined, so that various data information such as road conditions, health data of a patient, a temperature or a humidity of a specified place can be monitored in real time and regularly reported, thereby implementing intelligent management between machines.

Uplink data packets such as a heartbeat packet and a data packet in the MTC are discontinuous and have a relatively small throughput. Particularly, a heartbeat package of an Internet application on a mobile phone has a relatively long period. For example, a heartbeat period of an old version of QQ is 30 s, a heartbeat period of a new version of QQ is 180 s, a heartbeat period of WeChat is 300 s, and a heartbeat period of a Google native application is about 1680 s. As a result, a terminal device (such as a mobile phone or a terminal device in the MTC) that sends such type of data packets enters a radio resource control (RRC) idle state or a state of out of uplink synchronization with a base station. Once the terminal device enters the RRC idle state or the state of out of uplink synchronization, a large amount of signaling needs to be consumed to perform uplink data packet transmission. A current Long Term Evolution (LTE) network is mainly designed for transmission of discontinuous data packets with a large throughput.

FIG. 1A and FIG. 1B are respectively schematic diagrams of uplink data packet transmission in an LTE network by a terminal device that is in an RRC idle state and a terminal device that is in a state of out of uplink synchronization.

As shown in FIG. 1A, for the terminal device that is in the RRC idle state, for example, a user equipment (UE), random access needs to be first completed by performing step 101 and step 102, then an RRC connection needs to be established by performing step 103 to step 105, and then a base station, for example, an evolved NodeB (eNB), provides non-access stratum (NAS) information and RRC reconfiguration information to the UE respectively by performing step 106 and step 107. Finally, the UE sends an uplink data packet by performing step 108.

In FIG. 1B, for a UE that is in a state of out of uplink synchronization, a random access process also needs to be first completed by performing step 111 and step 112. A random access response (RAR) in step 112 carries a synchronization instruction, for example, a timing advance (TA) instruction. Then, in step 113, the UE sends a scheduling request (SR) or a buffer status report (BSR) to the eNB. After receiving a scheduling grant (SG) sent by the eNB in step 114, the UE finally sends the uplink data packet in step 115.

It can be learned that in the current LTE network, for the terminal device that is in the RRC idle state or in the state of out of uplink synchronization, signaling exchange needs to be performed between the terminal device and the base station eNB for multiple times before the terminal device sends uplink data. For example, random access or establishment of an RRC connection needs to be completed by means of signaling exchange. However, for the foregoing discontinuous service data packets with a relatively small throughput, if the foregoing method is used to transmit uplink data, resource utilization is relatively low, and power consumption is relatively high. In addition, as Internet applications and MTC become popular, a large quantity of terminal devices periodically send the heartbeat packet or such type of data packets, causing network congestion and even a signaling storm.

SUMMARY

Embodiments of the present disclosure provide an uplink data packet transmission method, a terminal device, and a base station, so as to improve resource utilization, and reduce power consumption.

The embodiments of the present disclosure may be specifically implemented by using the following technical solutions.

According to a first aspect, an uplink data packet transmission method is provided, where the method includes:

determining, by a terminal device, a cyclic prefix CP length of a first uplink data frame;

if the terminal device is in a state of out of uplink synchronization with a base station and in a radio resource control RRC connected state, or the terminal device is in an RRC idle state, generating, by the terminal device, the first uplink data frame for an uplink data packet according to the CP length, where the CP length of the first uplink data frame is greater than a first CP length, and the first CP length is a CP length of an uplink data frame sent by a terminal device that is in a state of uplink synchronization and in an RRC connected state; and sending, by the terminal device, the first uplink data frame to the base station.

With reference to the first aspect, in a first possible implementation, the CP length of the first uplink data frame is greater than or equal to a sum of a round-trip delay RTD between the terminal device and the base station and a maximum delay spread.

With reference to the first aspect, in a second possible implementation, if the first time-frequency resource is a common resource, the first uplink data frame carries identity information of the terminal device.

With reference to the first aspect, in a third possible implementation, after the sending, by the terminal device, the first uplink data frame to the base station, the method further includes:

receiving, by the terminal device, an answer message sent by the base station, and determining, according to the answer message, whether the uplink data packet needs to be retransmitted; and if the terminal device determines that the uplink data packet needs to be retransmitted, generating, by the terminal device, a third uplink data frame according to the CP length, and sending the third uplink data frame to the base station.

With reference to the third possible implementation, in a fourth possible implementation, if the first time-frequency resource is a common resource, the answer message includes identity information of the terminal device.

With reference to the second or the fourth possible implementation, in a fifth possible implementation, if the terminal device is in an RRC connected state, the identity information includes a cell radio network temporary identifier C-RNTI; or if the terminal device is in an RRC idle state, the identity information includes a temporary mobile subscriber identity TMSI or an international mobile subscriber identity IMSI.

With reference to any one of the first aspect or the foregoing possible implementations of the first aspect, in a sixth possible implementation, the method further includes:

sending, by the terminal device, capability information to the base station, where the capability information is used to indicate that the terminal device supports generating of an uplink data frame according to the CP length.

With reference to any one of the first aspect or the foregoing possible implementations of the first aspect, in a seventh possible implementation, the first uplink data frame further includes a guard time GT.

With reference to any one of the first aspect or the foregoing possible implementations of the first aspect, in an eighth possible implementation, before the generating, by the terminal device, the first uplink data frame, the method further includes:

if the terminal device is in a state of out of uplink synchronization and in an RRC connected state, or the terminal device is in an RRC idle state, generating, by the terminal device, an uplink scheduling request SR frame according to the CP length; and sending, by the terminal device, the uplink SR frame to the base station.

With reference to any one of the first aspect or the foregoing possible implementations of the first aspect, in a ninth possible implementation, before the generating, by the terminal device, the first uplink data frame, the method further includes:

if the terminal device is in a state of out of uplink synchronization and in an RRC connected state, or the terminal device is in an RRC idle state, generating, by the terminal device, an uplink buffer status report BSR frame according to the CP length; and sending, by the terminal device, the uplink BSR frame to the base station.

According to a second aspect, an uplink data packet transmission method is provided, where the method includes:

sending, by a base station, resource configuration information to a terminal device, where the resource configuration information is used to indicate a first time-frequency resource allocated for the terminal device by the base station to transmit an uplink data packet;

and receiving, by the base station, a first uplink data frame that is generated for the uplink data packet by the terminal device and that is sent by using the first time-frequency resource, where if the terminal device is in a state of out of uplink synchronization with the base station and in a radio resource control RRC connected state, or the terminal device is in an RRC idle state, a CP length of the first uplink data frame is greater than a first CP length, and the first CP length is a CP length of an uplink data frame sent by a terminal device that is in a state of uplink synchronization and in an RRC connected state.

With reference to the second aspect, in a first possible implementation, the CP length of the first uplink data frame is greater than or equal to a sum of a round-trip delay RTD between the terminal device and the base station and a maximum delay spread.

With reference to the second aspect or the first possible implementation, in a second possible implementation, if the first time-frequency resource is a common resource, the first uplink data frame carries identity information of the terminal device.

With reference to any one of the second aspect or the possible implementations of the second aspect, in a third possible implementation, after the receiving, by the base station, the first uplink data frame, the method further includes:

sending, by the base station, an answer message to the terminal device, so that the terminal device determines, according to the answer message, whether the uplink data packet needs to be retransmitted.

With reference to the third possible implementation, in a fourth possible implementation, if the first time-frequency resource is a common resource, the answer message includes the identity information of the terminal device.

With reference to the second or the fourth possible implementation, in a fifth possible implementation, if the terminal device is in an RRC connected state, the identity information includes a cell radio network temporary identifier C-RNTI; or if the terminal device is in an RRC idle state, the identity information includes a temporary mobile subscriber identity TMSI or an international mobile subscriber identity IMSI.

With reference to any one of the second aspect or the foregoing possible implementations of the second aspect, in a sixth possible implementation, the method further includes:

receiving, by the base station, capability information sent by the terminal device, where the capability information is used to indicate that the terminal device supports generating of an uplink data frame according to the CP length.

With reference to any one of the second aspect or the foregoing possible implementations of the second aspect, in a seventh possible implementation, the first uplink data frame further includes a guard time GT.

With reference to any one of the second aspect or the possible implementations of the second aspect, in an eighth possible implementation, before the receiving, by the base station, a first uplink data frame, the method further includes:

receiving, by the base station, an uplink scheduling request SR frame sent by the terminal device, where if the terminal device is in a state of out of uplink synchronization and in an RRC connected state, or the terminal device is in an RRC idle state, the uplink SR frame is generated by the terminal device according to the CP length.

With reference to any one of the second aspect or the possible implementations of the second aspect, in a ninth possible implementation, before the receiving, by the base station, a first uplink data frame, the method further includes:

receiving, by the base station, an uplink buffer status report BSR frame sent by the terminal device, where if the terminal device is in a state of out of uplink synchronization and in an RRC connected state, if the terminal device is in an RRC idle state, the uplink BSR frame is generated by the terminal device according to the CP length.

According to a third aspect, a terminal device is provided, including:

a processor, configured to determine a cyclic prefix CP length of a first uplink data frame, where if the terminal device is in a state of out of uplink synchronization with a base station and in a radio resource control RRC connected state, or the terminal device is in an RRC idle state, the processor is further configured to generate the first uplink data frame for an uplink data packet according to the CP length, where the CP length of the first uplink data frame is greater than a first CP length, and the first CP length is a CP length of an uplink data frame sent by a terminal device that is in a state of uplink synchronization and in an RRC connected state; and a transceiver, configured to send the first uplink data frame to the base station.

According to a fourth aspect, a base station is provided, including:

a transmitter, configured to send resource configuration information to a terminal device, where the resource configuration information is used to indicate a first time-frequency resource allocated for the terminal device by the base station to transmit an uplink data packet; and a receiver, configured to receive a first uplink data frame that is generated for the uplink data packet by the terminal device and that is sent by using the first time-frequency resource, where if the terminal device is in a state of out of uplink synchronization with the base station and in a radio resource control RRC connected state, or the terminal device is in an RRC idle state, a CP length of the first uplink data frame is greater than a first CP length, and the first CP length is a CP length of an uplink data frame sent by a terminal device that is in a state of uplink synchronization and in an RRC connected state.

According to a fifth aspect, a communications system is provided, including:

a terminal device, configured to determine a cyclic prefix CP length of a first uplink data frame; and a base station, configured to receive the first uplink data frame sent by the terminal device, where if the terminal device is in a state of out of uplink synchronization with the base station and in a radio resource control RRC connected state, or the terminal device is in an RRC idle state, the terminal device is configured to generate the first uplink data frame for an uplink data packet according to the CP length, where the CP length of the first uplink data frame is greater than a first CP length, and the first CP length is a CP length of an uplink data frame sent by a terminal device that is in a state of uplink synchronization and in an RRC connected state.

According to the uplink data packet transmission method provided in the embodiments of the present disclosure, if the terminal device is in the state of out of uplink synchronization and in the RRC connected state, or is in the RRC idle state, the first uplink data frame is generated for the uplink data packet according to the CP length and sent to the base station. The CP length of the first uplink data frame is greater than the CP length of the uplink data frame sent by the terminal device that is in the state of uplink synchronization and in the RRC connected state. Therefore, signaling procedures such as random access and uplink synchronization can be omitted, so that the terminal device can directly send the uplink data packet by performing signaling exchange once. This improves resource utilization, and reduces power consumption.

BRIEF DESCRIPTION OF DRAWINGS

FIG. 2 is a schematic diagram of a communications system used for uplink data packet transmission according to an embodiment of the present disclosure;

DESCRIPTION OF EMBODIMENTS

Figure 1:
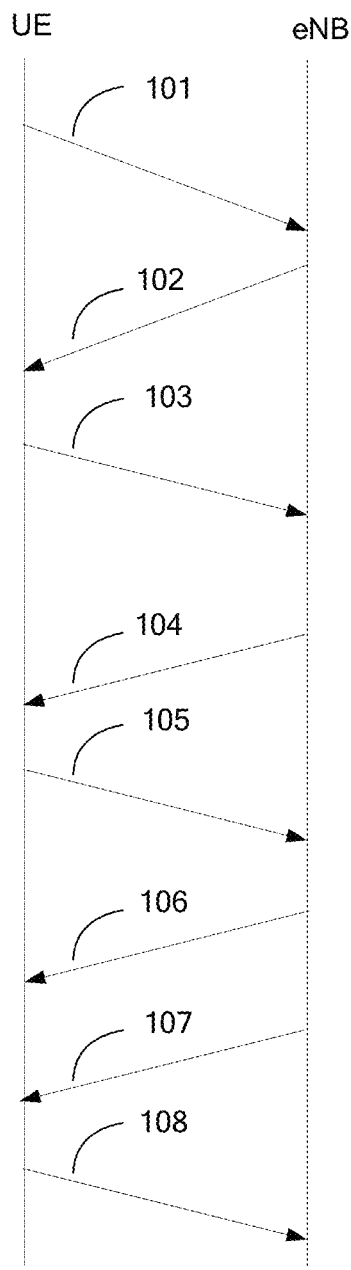
FIG. 1A and FIG. 1B are respectively schematic diagrams of uplink data packet transmission in an LTE network by a terminal device that is in an RRC idle state and a terminal device that is in a state of out of uplink synchronization.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Technical solutions provided in the embodiments of the present disclosure may be applied to various wireless communications networks, such as a Code Division Multiple Access (CDMA) network, a Time Division Multiple Access (TDMA) network, a Frequency Division Multiple Access (FDMA) network, an Orthogonal Frequency-Division Multiple Access (OFDMA) network, and a Single Carrier Frequency Division Multiple Access (SC-FDMA) network. The terms "network" and "system" can be interchanged with each other. The CDMA network may implement wireless technologies such as Universal Terrestrial Radio Access (UTRA) and CDMA2000. UTRA may include CDMA, WCDMA, and other variations of CDMA. CDMA2000 may cover the interim standard (IS) 2000, the IS-95 standard, and the IS-856 standard. The TDMA network may implement a wireless technology such as a Global System for Mobile Communications (GSM). The OFDMA network may implement wireless technologies such as Evolved Universal Terrestrial Radio Access (E-UTRA), Ultra Mobile Broadband (UMB) technology, IEEE 802.11 (Wi-Fi), IEEE 802.16 (WiMAX), IEEE 802.20, and Flash OFDMA. UTRA and E-UTRA are respectively based on a UMTS and an evolved version of the UMTS. A new version of E-UTRA UMTS is used in 3GPP Long Term Evolution (LTE) and LTE Advanced (LTE-A). The UTRA, E-UTRA, UMTS, LTE, LTE-A, and GSM are recorded and described in documents of the standardization organization 3GPP. CDMA2000 and UMB are recorded and described in documents of the standardization organization 3GPP2.

In the embodiments of the present disclosure, terminal devices may be distributed in an entire wireless network. The terminal device may be referred to as user equipment (UE), a mobile station, a subscriber unit, a station, or the like. The UE may be a cellular phone, a personal digital assistant (PDA), a wireless modem, a wireless communications device, a handheld device, a laptop computer, a cordless phone, a wireless local loop (WLL) station, an MTC device, or the like. In the embodiments of the present disclosure, each terminal device may be stationary or mobile, and the terminal device is in a state of out of uplink synchronization with a base station and in an RRC connected state, or is in an RRC idle state.

In the embodiments of the present disclosure, an uplink data packet is a discontinuous uplink data packet with a relatively small throughput, such as a data packet periodically detected and reported by a terminal device in an MTC scenario, a short heartbeat packet or service data packet regularly sent by an Internet application, or a response message packet from an uplink TCP layer. This is not limited in the embodiments of the present disclosure.

A network architecture and a service scenario that are described in the following embodiments of the present disclosure are intended to describe technical solutions in the embodiments of the present disclosure more clearly, and do not constitute a limitation to the technical solutions provided in the embodiments of the present disclosure. A person of ordinary skill in the art should know that, as network architectures evolve and new service scenarios emerge, the technical solutions provided in the embodiments of the present disclosure are still applicable to similar technical problems.

FIG. 2 shows a communications system 200 according to an embodiment of the present disclosure. The communications system 200 is configured to implement transmission of an uplink data packet. Specifically, the system 200 includes a terminal device 220 and a base station 240. For example, the base station 240 includes an evolved NodeB eNodeB. The terminal device 220 may include a transceiver 222 and a processor 224. The base station 240 may include a transceiver 242 and a processor 244. The transceiver 222 or the transceiver 242 may be implemented by a transmitter and a receiver separately. The terminal device 220 and the base station 240 send and receive information between each other by using their respective transceivers.

In the communications system 200, the terminal device 220 is configured to determine a cyclic prefix (CP) length of a first uplink data frame, and send the first uplink data frame to the base station 240 on this basis. The base station 240 is configured to receive the first uplink data frame sent by the terminal device 220.

If the terminal device 220 is in a state of out of uplink synchronization with the base station 240 and in an RRC connected state, or the terminal device 220 is in an RRC idle state, the terminal device 220 is configured to generate the first uplink data frame for an uplink data packet according to the CP length. The CP length of the first uplink data frame is greater than a first CP length, and the first CP length is a CP length of an uplink data frame sent by a terminal device that is in a state of uplink synchronization and in an RRC connected state. When an uplink data packet is transmitted by using the communications system in the present disclosure, signaling procedures such as random access and uplink synchronization can be omitted, so that the terminal device can directly send the uplink data packet by performing signaling exchange once. This improves resource utilization, and reduces power consumption.

Descriptions are specifically provided in the following with reference to embodiments of FIG. 3 to FIG. 6.

Figure 3:
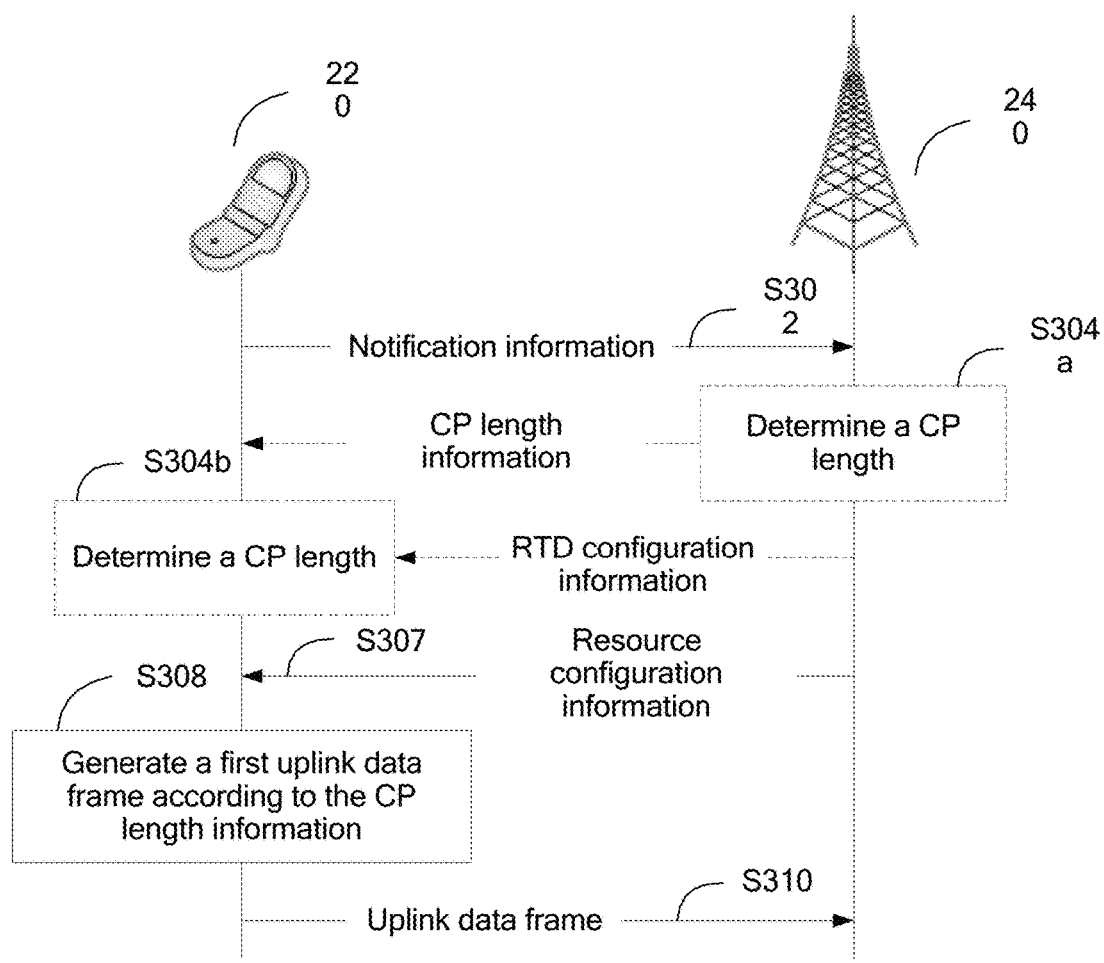
FIG. 3 is a diagram of signaling exchange in an uplink data packet transmission method according to an embodiment of the present disclosure.

FIG. 3 shows an uplink data packet transmission method according to an embodiment of the present disclosure. As shown in FIG. 3, the method includes the following steps.

Step S302: After being connected to a network, a terminal device sends capability information to a base station, where the capability information is used to indicate that the terminal device supports generating of an uplink data frame according to a determined CP length, that is, the terminal device supports sending of an uplink data packet in a data frame format in the following step S308.

For example, the terminal device may send the capability information to the base station in the following manner: The base station first sends a UE capability inquiry message to the terminal device, and then the terminal device returns the UE capability information to the base station; or the terminal device may actively provide the capability information to the base station. For example, the terminal device sends an RRC command to the base station, where the RRC command carries the capability information. Optionally, the RRC command includes an RRC reconfiguration command.

Optionally, the capability information may further carry attribute information of the uplink data packet. For example, the attribute information of the uplink data packet is used to indicate whether the uplink data packet is a periodically sent data packet. For example, an Internet application periodically sends a "heartbeat packet" to the base station, or in some MTC scenarios, for example, when MTC is applied to measurement of a temperature of an ambient environment or another air quality index, the terminal device also periodically sends a data packet to the base station. All attribute information in the foregoing scenarios may be carried in capability information of UE.

Step S304: The terminal device obtains a CP length used for uplink transmission. For example, the terminal device may obtain the CP length by performing step S304a or step S304b.

Step S304a: The base station determines, for the terminal device, the CP length used for uplink transmission, and provides, to the terminal device, CP length information used to indicate the CP length.

Step S304b: The base station sends round-trip delay (RTD) configuration information to the terminal device, where the RTD configuration information is used to indicate an RTD value between the terminal device and the base station. After receiving the RTD configuration information, the terminal device calculates the CP length according to the RTD value.

For example, the base station may send the CP length information or the RTD configuration information to the terminal device by using an RRC command (for example, an RRC reconfiguration command), or the base station may send the CP length information or the RTD configuration information to the terminal device by means of broadcast.

When the terminal device is in a state of out of uplink synchronization with the base station and in an RRC connected state, or is in an RRC idle state, different from the prior art in which a base station determines, for a terminal device on which uplink synchronization has been established, that a CP length is greater than or equal to a maximum delay spread, in the present disclosure, the base station or the terminal device may determine the CP length for the terminal device according to an RTD. Optionally, the CP length may be determined for the terminal device according to the RTD and the maximum delay spread. For example, in the present disclosure, it may be determined that the CP length is greater than or equal to a sum of the RTD and the maximum delay spread. Therefore, according to the uplink data packet transmission method in the present disclosure, before uplink synchronization is established between the terminal device and the base station, the CP length is determined based on the sum of the RTD and the maximum delay spread; and after the uplink synchronization is established between the terminal device and the base station, the CP length is determined based on the maximum delay spread.

Step S306: The base station sends resource configuration information to the terminal device, where the resource configuration information is used to indicate a first time-frequency resource allocated for the terminal device by the base station to transmit the uplink data packet.

The time-frequency resource includes a frequency of the time-frequency resource, duration of the time-frequency resource, and resource block (RB) information of the time-frequency resource. For example, the frequency of the time-frequency resource may be 1.5 GHz or 1.8 GHz, and the duration of the time-frequency resource may be one millisecond or ten milliseconds. Optionally, when the time-frequency resource is periodic, the time-frequency resource may further include an emergence period of the time-frequency resource. The time-frequency resource may include a common resource, a dedicated resource, or a combination thereof. The common resource is a time-frequency resource shared by multiple terminal devices. For example, multiple terminal devices may share a time-frequency resource by means of contention. The dedicated resource is a time-frequency resource exclusively used by a terminal device.

The base station may send the resource configuration information to the terminal device in multiple manners. For example, the base station may send the resource configuration information to the terminal device by using an RRC command (for example, an RRC reconfiguration command), or the base station may send the resource configuration information to the terminal device by means of broadcast, or the base station may send the resource configuration information to the terminal device by using a downlink control channel.

Optionally, the resource configuration information further includes identity (ID) information of the terminal device. For example, the ID information of the terminal device includes, but is not limited to, a cell radio network temporary identifier (C-RNTI), a temporary mobile subscriber identity (TMSI), or an international mobile subscriber identity (IMSI) of the terminal device. However, the present disclosure is not limited thereto. The ID information of the terminal device may further include another unique user identify in a cell set.

It should be noted that step S304 may be performed before step S306 is performed, or step S306 may be performed before step S304 is performed, or step S304 and step S306 are performed at the same time. This is not limited in the present disclosure.

Step S308: If the terminal device is in a state of out of uplink synchronization with the base station and in an RRC connected state, or the terminal device is in an RRC idle state, the terminal device generates a first uplink data frame for the uplink data packet according to the CP length, where the CP length of the first uplink data frame is greater than a first CP length, and the first CP length is a CP length of an uplink data frame sent by a terminal device that is in a state of uplink synchronization and in an RRC connected state. For example, the first uplink data frame is generated according to the following first format:

| CP | data |
|---|---|

CP is a cyclic prefix field, and data indicates a data zone in the first uplink data frame. The terminal device generates the first uplink data frame according to the CP length. The CP length of the first uplink data frame is greater than the first CP length, and the first CP length is the CP length of the uplink data frame sent by the terminal device that is in a state of uplink synchronization and in an RRC connected state. For example, the CP length of the first uplink data frame may be greater than or equal to the sum of the RTD and the maximum delay spread. Different from that a CP length is greater than or equal to a maximum delay spread in the prior art, the CP length of the uplink data frame sent by using the method in the present disclosure is at least greater than or equal to the sum of the RTD and the maximum delay spread.

Step S310: The terminal device sends the first uplink data frame generated in step 308 to the base station on the first time-frequency resource allocated by the base station.

Therefore, according to the uplink data packet transmission method in the present disclosure, if the terminal device is in the state of out of uplink synchronization and in the RRC connected state, or is in the RRC idle state, the terminal device obtains the CP length of the uplink data frame, generates the uplink data frame according to the CP length accordingly, and sends the uplink data frame. The CP length is greater than the CP length of the uplink data frame sent by the terminal device that is in the state of uplink synchronization and in the RRC connected state. For example, the CP length is at least greater than or equal to the sum of the RTD and the maximum delay spread. In this way, after the base station that receives the uplink data frame removes the CP, it may be ensured that uplink data of multiple terminal devices is aligned, and signaling procedures such as random access and uplink synchronization can be omitted, so that the terminal device can directly send the uplink data packet by performing signaling exchange once. This improves resource utilization, and reduces power consumption.

In a subsequent uplink data packet transmission process, the terminal device may perform neither step S302 nor step S304, that is, uplink data packet transmission can be implemented by performing only step S306 to step S310. When a time-frequency resource is periodically configured, or in duration of the time-frequency resource, step S306 may be further omitted, and the uplink data packet may be directly sent by performing step S308 and step S310, so that signaling exchange in the uplink transmission process is further reduced. This improves resource utilization, and reduces power consumption.

Optionally, the first uplink data frame generated by the terminal device in step 308 further includes a guard time (GT) used for uplink transmission. The guard time is used to prevent a current data frame from causing interference to a next data frame. For example, the terminal device generates the first uplink data frame according to the following second format:

| CP | data | GT |
|---|---|---|

CP is a cyclic prefix field, data indicates a data zone in the first uplink data frame, and GT is a guard time field. A value of GT may be zero or nonzero. Optionally, the terminal device may obtain GT information from the base station. For example, the resource configuration information sent by the base station to the terminal device may carry the GT information.

Optionally, if the terminal device is in a state of uplink synchronization, but the first time-frequency resource is a common resource, that is, the terminal device chooses to send the uplink data frame by using a common resource, the terminal device generates a second uplink data frame according to a prior-art format, and sends the second uplink data frame. That is, a CP length of the second uplink data frame is equal to the first CP length. It should be noted that a common resource used by the terminal device that is in a state of uplink synchronization is different from a common resource used by the terminal device that is in a state of out of uplink synchronization.

Optionally, if the first time-frequency resource is a common resource, that is, the terminal device chooses to send an uplink data frame (for example, the first uplink data frame or the second uplink data frame) by using a common resource, the uplink data frame further includes the ID information of the terminal device. For example, if the terminal device is in an RRC connected state, the uplink data frame of the terminal device further includes the C-RNTI of the terminal device; or if the terminal device is in an RRC idle state, the uplink data frame of the terminal device further includes the TMSI or the IMSI of the terminal device, or multiple pieces of other ID information that can identify the terminal device in a cell. Optionally, the ID information of the terminal device may be included in the data zone (data) in the data frame, or a byte representing the ID information may be added to the data frame. Therefore, a base station that receives the uplink data frame can identify the terminal device according to the ID information.

Optionally, after step S310, the method further includes the following steps.

Step S312: After receiving the uplink data frame sent by the terminal device, the base station returns an answer message to the terminal device. The answer message includes an acknowledgment ACK (acknowledgment) message or a negative acknowledgment NACK (negative acknowledgment) message. If the base station successfully receives the uplink data frame sent by the terminal device, the base station returns an ACK message; or if the base station fails to receive the uplink data frame sent by the terminal device, the base station returns a NACK message.

Optionally, if the first time-frequency resource is a common resource, that is, the terminal device chooses to send the first uplink data frame or the second uplink data frame by using a common resource, the answer message (an ACK message or a NACK message) includes the ID information of the terminal device. The ID information of the terminal device includes, but is not limited to, the C-RNTI, the TMSI, or the IMSI. For example, if the terminal device is in an RRC connected state, the uplink data frame of the terminal device further includes the C-RNTI of the terminal device; or if the terminal device is in an RRC idle state, the uplink data frame of the terminal device further includes the TMSI or the IMSI of the terminal device.

Step S314: The terminal device receives the answer message sent by the base station, and determines, according to the answer message, whether the uplink data packet needs to be retransmitted. Specifically, if the answer message is an ACK message, it indicates that the first uplink data frame is successfully sent, and the first uplink data frame does not need to be retransmitted; or if the answer message is a NACK message, it indicates that the first uplink data frame is not successfully sent, and the first uplink data frame needs to be retransmitted.

Step S316: If the terminal device determines that the uplink data packet needs to be retransmitted, the terminal device generates a third uplink data frame according to the CP length, and sends the third uplink data frame to the base station. For generating of the third uplink data frame by the terminal device according to the CP length, refer to descriptions about generating of the first uplink data frame by the terminal device according to the CP length in step S308, and details are not repeated.

When a terminal device chooses to send an uplink data packet by using a common resource, multiple terminal devices may use a same time-frequency resource to send uplink data packets. As a result, a base station may successfully receive only one or several of the multiple uplink data packets. Because an answer message (an ACK message or a NACK message) sent by the base station includes ID information of a terminal device, a terminal device that receives the answer message may learn, according to the ID information, whether the terminal device successfully sends the uplink data packet, so that accuracy of determining, by the terminal device, whether retransmission is required is improved. In addition, unnecessary signaling overheads caused by incorrect determining are reduced, thereby improving resource utilization, and reducing power consumption.

Figure 4:
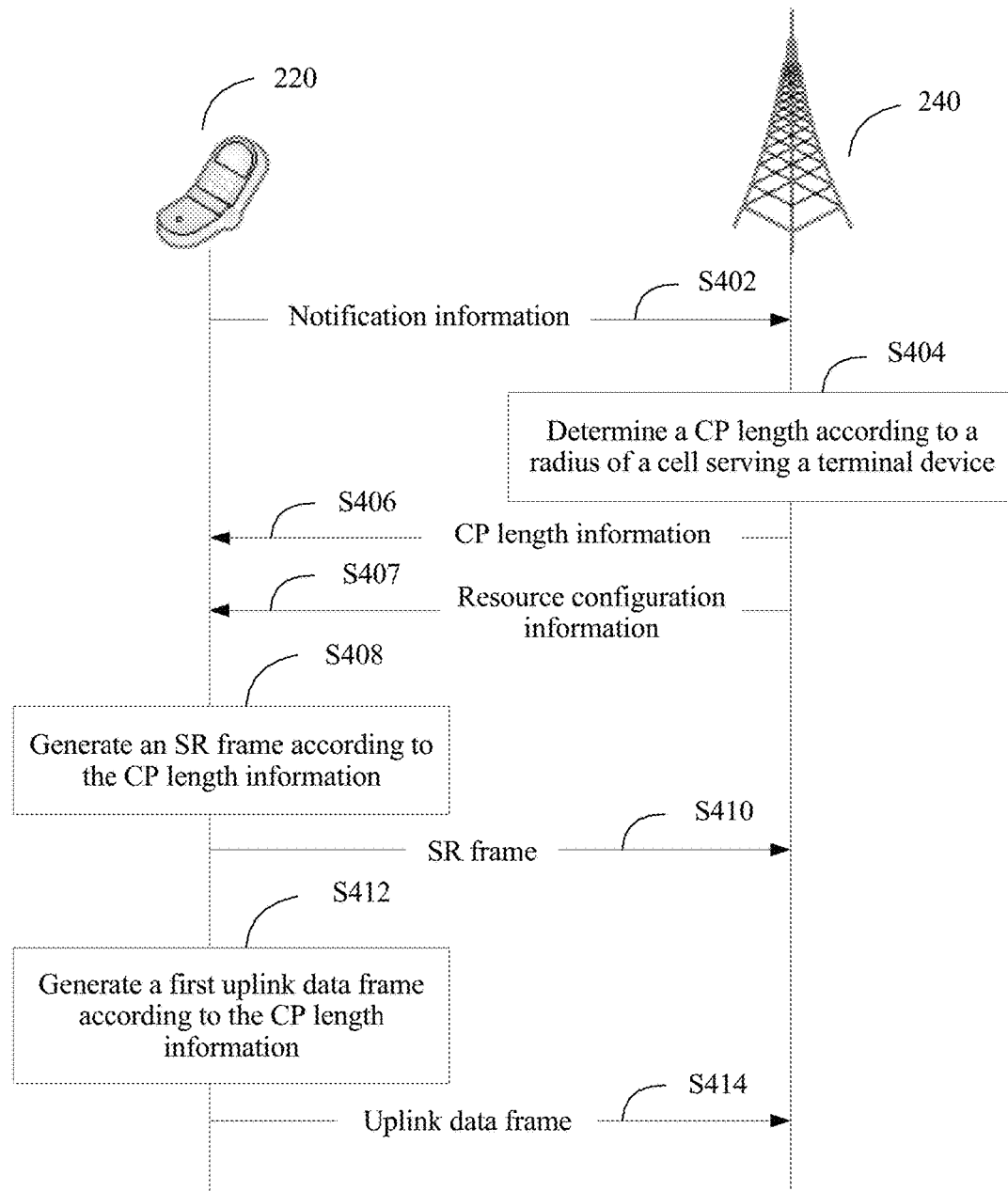
FIG. 4 is a diagram of signaling exchange in an uplink data packet transmission method according to another embodiment of the present disclosure.

FIG. 4 shows an uplink data packet transmission method according to another embodiment of the present disclosure. As shown in FIG. 4, the method includes the following steps.

Step S402: After being connected to a network, a terminal device sends capability information to a base station, where the capability information is used to indicate that the terminal device supports generating of an uplink data frame according to a determined CP length.

Step S404: The terminal device obtains a CP length used for uplink transmission.

Step S406: The base station sends resource configuration information to the terminal device.

For step S402 to step S406, refer to descriptions of step S302 to step S306 in FIG. 3, and details are not repeated herein.

Step S408: If the terminal device is in a state of out of uplink synchronization with the base station and in an RRC connected state, or the terminal device is in an RRC idle state, the terminal device generates a scheduling request (SR) frame for an uplink data packet according to the CP length. For example, the SR frame is generated according to the following third format:

| CP | SR |
|---|---|

CP is a cyclic prefix field, and SR is a scheduling request field, and is used to notify the base station that the terminal device requests for uplink data packet uploading. The terminal device generates the SR frame according to the CP length, that is, the CP length of the SR frame is at least greater than a CP length of an uplink data frame sent by a terminal device that is in a state of uplink synchronization and in an RRC connected state. For example, the CP length of the SR frame is at least greater than or equal to a sum of an RTD and a maximum delay spread.

Optionally, the SR frame generated by the terminal device further includes a GT used for uplink transmission, and the GT is used to prevent a current SR frame from causing interference to a next data frame. For example, the terminal device generates the SR frame according to the following fourth format:

| CP | SR | GT |
|---|---|---|

CP is a cyclic prefix field, SR is a scheduling request field, and GT is a guard time field. A value of GT may be zero or nonzero. Optionally, the terminal device may obtain GT information from the base station. For example, the resource configuration information sent by the base station to the terminal device may carry the GT information.

Step S410: The terminal device sends the SR frame generated in step S408 to the base station.

A second time-frequency resource used to transmit an uplink scheduling request SR frame includes a common resource or a dedicated resource. That is, the terminal device may choose to send the SR frame by using the common resource or the dedicated resource. Optionally, if the second time-frequency resource is a common resource, that is, the terminal device chooses to send the SR frame by using the common resource, the SR frame further includes ID information of the terminal device. For example, if the terminal device is in an RRC connected state, the SR frame of the terminal device further includes a C-RNTI of the terminal device; or if the terminal device is in an RRC idle state, the SR frame of the terminal device further includes a TMSI or an IMSI of the terminal device, or multiple pieces of other ID information that can identify the terminal device in a cell. Optionally, the ID information of the terminal device may be included in the scheduling request field in the SR frame, or a byte representing the ID information may be added to the SR frame.

After receiving the SR frame sent by the terminal device, the base station allocates, for the terminal device, a first time-frequency resource used to transmit an uplink data packet, and sends the resource configuration information to the terminal device on this basis. Optionally, if the SR frame is sent to the base station by using a common resource, the resource configuration information sent by the base station to the terminal device further includes the ID information of the terminal device. If the terminal device is in an RRC connected state, the resource configuration information further includes the C-RNTI of the terminal device; or if the terminal device is in an RRC idle state, the resource configuration information further includes the TMSI or the IMSI of the terminal device, or multiple pieces of other ID information that can identify the terminal device in a cell.

Step S412: If the terminal device is in a state of out of uplink synchronization with the base station and in an RRC connected state, or the terminal device is in an RRC idle state, the terminal device generates a first uplink data frame for the uplink data packet according to the CP length.

Step S414: The terminal device sends the first uplink data frame generated in step S412 to the base station.

For step S412 and step S414, refer to descriptions of step S308 and step S310 in FIG. 3, and details are not repeated herein.

Therefore, according to the uplink data packet transmission method in the present disclosure, if the terminal device is in the state of out of uplink synchronization and in the RRC connected state, or is in the RRC idle state, the terminal device obtains the CP length of the uplink data frame, generates the SR frame and the uplink data frame according to the CP length accordingly, and successively sends the SR frame and the uplink data frame. The CP length of the uplink data frame is at least greater than the CP length of the uplink data frame sent by the terminal device that is in the state of uplink synchronization and in the RRC connected state. For example, the CP length is at least greater than or equal to the sum of the RTD and the maximum delay spread. In this way, after the base station that receives the uplink data frame removes the CP, it may be ensured that uplink data of multiple terminal devices is aligned, and signaling procedures such as random access, establishment of an RRC connection, and uplink synchronization can be omitted, so that the terminal device can directly send the uplink data packet by performing signaling exchange twice. This improves resource utilization, and reduces power consumption.

In a subsequent uplink data packet transmission process, the terminal device may perform neither step S402 nor step S404, that is, uplink data packet transmission can be implemented by performing only step S406 to step S414. When a time-frequency resource is periodically configured, or in duration of the time-frequency resource, step S406 may be further omitted, and the uplink data packet may be directly sent by performing step S408 to step S414, so that signaling exchange in the uplink transmission process is further reduced. This improves resource utilization, and reduces power consumption.

Figure 5:
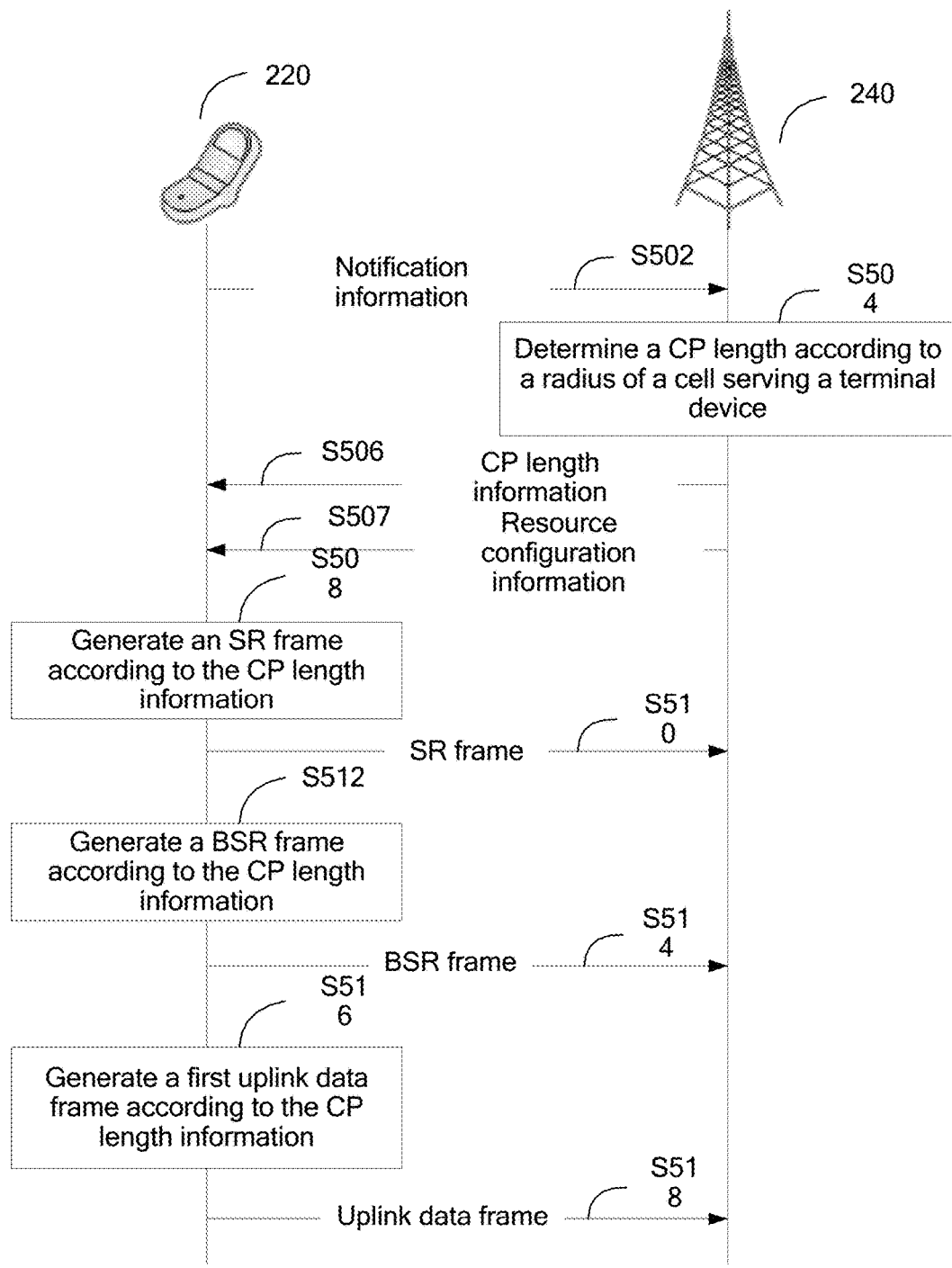
FIG. 5 is a diagram of signaling exchange in an uplink data packet transmission method according to still another embodiment of the present disclosure.

Optionally, after sending the SR frame to the base station, the terminal device may further send a buffer status report (BSR) frame to the base station, as shown in FIG. 5. In an embodiment of FIG. 5, the method includes the following steps.

Step S502: After being connected to a network, a terminal device sends capability information to a base station, where the capability information is used to indicate that the terminal device supports generating of an uplink data frame according to a determined CP length.

Step S504: The terminal device obtains a CP length used for uplink transmission.

Step S506: The base station sends resource configuration information to the terminal device.

Step S508: If the terminal device is in a state of out of uplink synchronization with the base station and in an RRC connected state, if the terminal device is in an RRC idle state, the terminal device generates an SR frame for an uplink data packet according to the CP length.

Step S510: The terminal device sends the SR frame generated in step S508 to the base station.

For step S502 to step S510, refer to descriptions of step S402 to step S410 in FIG. 4, and details are not repeated herein.

After receiving the SR frame sent by the terminal device, the base station allocates, for the terminal device, a third time-frequency resource used to transmit a BSR frame, and sends the resource configuration information to the terminal device on this basis. Optionally, if the SR frame is sent to the base station by using a common resource, the resource configuration information sent by the base station to the terminal device further includes ID information of the terminal device. If the terminal device is in an RRC connected state, the resource configuration information further includes a C-RNTI of the terminal device; or if the terminal device is in an RRC idle state, the resource configuration information further includes a TMSI or an IMSI of the terminal device, or multiple pieces of other ID information that can identify the terminal device in a cell.

Step S512: If the terminal device is in a state of out of uplink synchronization with the base station and in an RRC connected state, or the terminal device is in an RRC idle state, the terminal device generates a BSR frame for the uplink data packet according to the CP length. For example, the BSR frame is generated according to the following fifth format:

| CP | BSR |
|---|---|

CP is a cyclic prefix field, and BSR is a buffer status report field, and is used to notify the base station of a size of an uplink data packet that is requested by the terminal device to be uploaded. The terminal device generates the BSR frame according to the CP length, that is, the CP length of the BSR frame is at least greater than a CP length of an uplink data frame sent by a terminal device that is in a state of uplink synchronization and in an RRC connected state. For example, the CP length of the BSR frame is at least greater than or equal to a sum of an RTD and a maximum delay spread.

Optionally, the BSR frame generated by the terminal device further includes a GT used for uplink transmission, and the GT is used to prevent a current BSR frame from causing interference to a next data frame. For example, the terminal device generates the BSR frame according to the following sixth format:

| CP | BSR | GT |
|---|---|---|

CP is a cyclic prefix field, BSR is a buffer status report field, and GT is a guard time field. A value of GT may be zero or nonzero. Optionally, the terminal device may obtain GT information from the base station. For example, the resource configuration information sent by the base station to the terminal device may carry the GT information.

Step S514: The terminal device sends the BSR frame generated in step S512 to the base station.

The third time-frequency resource used to transmit a buffer status report (BSR) frame includes a common resource or a dedicated resource. That is, the terminal device may choose to send the BSR frame by using the common resource or the dedicated resource. Optionally, if the third time-frequency resource is a common resource, that is, the terminal device chooses to send the BSR frame by using the common resource, the BSR frame further includes the ID information of the terminal device. For example, if the terminal device is in an RRC connected state, the BSR frame of the terminal device further includes the C-RNTI of the terminal device; or if the terminal device is in an RRC idle state, the BSR frame of the terminal device further includes the TMSI or the IMSI of the terminal device, or multiple pieces of other ID information that can identify the terminal device in a cell. Optionally, the ID information of the terminal device may be included in a buffer status report field in the BSR frame, or a byte representing the ID information may be added to the BSR frame.

After receiving the BSR frame sent by the terminal device, the base station allocates, for the terminal device, a first time-frequency resource used to transmit an uplink data packet, and sends the resource configuration information to the terminal device on this basis. Optionally, if the BSR frame is sent to the base station by using a common resource, the resource configuration information sent by the base station to the terminal device further includes the ID information of the terminal device. If the terminal device is in an RRC connected state, the resource configuration information further includes the C-RNTI of the terminal device; or if the terminal device is in an RRC idle state, the resource configuration information further includes the TMSI or the IMSI of the terminal device, or multiple pieces of other ID information that can identify the terminal device in a cell.

Step S516: If the terminal device is in a state of out of uplink synchronization with the base station and in an RRC connected state, or the terminal device is in an RRC idle state, the terminal device generates a first uplink data frame for the uplink data packet according to the CP length.

Step S518: The terminal device sends the first uplink data frame generated in step S516 to the base station.

For step S516 and step S518, refer to descriptions of step S308 and step S310 in FIG. 3, and details are not repeated herein.

Therefore, according to the uplink data packet transmission method in the present disclosure, if the terminal device is in the state of out of uplink synchronization and in the RRC connected state, or is in the RRC idle state, the terminal device obtains the CP length of the uplink data frame, generates the SR, the BSR, and the uplink data frame according to the CP length accordingly, and successively sends the SR, the BSR, and the uplink data frame. The CP length of the uplink data frame is at least greater than the CP length of the uplink data frame sent by the terminal device that is in the state of uplink synchronization and in the RRC connected state. For example, the CP length is at least greater than or equal to the sum of the RTD and the maximum delay spread. In this way, after the base station that receives the uplink data frame removes the CP, it may be ensured that uplink data of multiple terminal devices is aligned, and signaling procedures such as random access, establishment of an RRC connection, and uplink synchronization can be omitted, so that the terminal device can directly send the uplink data packet by performing signaling exchange for three times. This improves resource utilization, and reduces power consumption.

In a subsequent uplink data packet transmission process, the terminal device may perform neither step S502 nor step S504, that is, uplink data packet transmission can be implemented by performing only step S506 to step S518. When a time-frequency resource is periodically configured, or in duration of the time-frequency resource, step S506 may be further omitted, and the uplink data packet may be directly sent by performing step S508 to step S518, so that signaling exchange in the uplink transmission process is further reduced. This improves resource utilization, and reduces power consumption.

Figure 6:
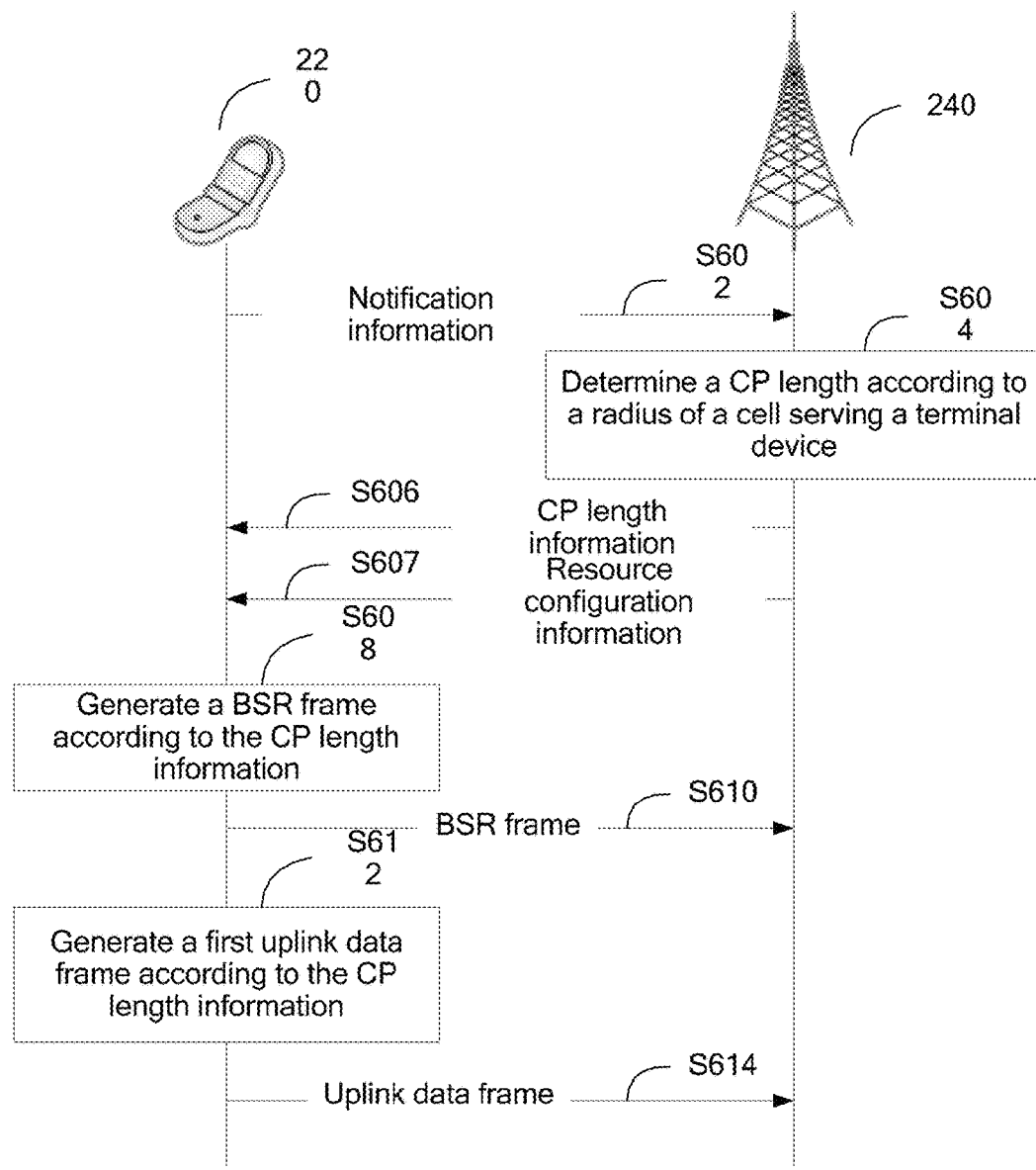
FIG. 6 is a diagram of signaling exchange in an uplink data packet transmission method according to yet another embodiment of the present disclosure.

In another embodiment, a terminal device may directly send a BSR frame to a base station without performing a step of sending an SR frame to the base station, as shown in FIG. 6. In an embodiment of FIG. 6, the method includes the following steps.

Step S602: After being connected to a network, a terminal device sends capability information to a base station, where the capability information is used to indicate that the terminal device supports generating of an uplink data frame according to a determined CP length.

Step S604: The terminal device obtains a CP length used for uplink transmission.

Step S606: The base station sends resource configuration information to the terminal device.

For step S602 to step S606, refer to descriptions of step S302 to step S306 in FIG. 3, and details are not repeated herein.

Step S608: If the terminal device is in a state of out of uplink synchronization with the base station and in an RRC connected state, or the terminal device is in an RRC idle state, the terminal device generates a BSR frame for an uplink data packet according to the CP length.

Step S610: The terminal device sends the BSR frame generated in step S608 to the base station.

For step S608 and step S610, refer to descriptions of step S512 and step S514 in FIG. 5, and details are not repeated herein.

After receiving the BSR frame sent by the terminal device, the base station allocates, for the terminal device, a first time-frequency resource used to transmit an uplink data packet, and sends the resource configuration information to the terminal device on this basis. Optionally, if the BSR frame is sent to the base station by using a common resource, the resource configuration information sent by the base station to the terminal device further includes ID information of the terminal device. If the terminal device is in an RRC connected state, the resource configuration information further includes a C-RNTI of the terminal device; or if the terminal device is in an RRC idle state, the resource configuration information further includes a TMSI or an IMSI of the terminal device, or multiple pieces of other ID information that can identify the terminal device in a cell.

Step S612: If the terminal device is in a state of out of uplink synchronization with the base station and in an RRC connected state, or the terminal device is in an RRC idle state, the terminal device generates a first uplink data frame for the uplink data packet according to the CP length.

Step S614: The terminal device sends the first uplink data frame generated in step S612 to the base station.

For step S612 and step S614, refer to descriptions of step S308 and step S310 in FIG. 3, and details are not repeated herein.

Therefore, according to the uplink data packet transmission method in the present disclosure, if the terminal device is in the state of out of uplink synchronization and in the RRC connected state, or is in the RRC idle state, the terminal device obtains the CP length of the uplink data frame, generates the BSR and the uplink data frame according to the CP length accordingly, and successively sends the BSR and the uplink data frame. The CP length of the uplink data frame is at least greater than the CP length of the uplink data frame sent by the terminal device that is in the state of uplink synchronization and in an RRC connected state. For example, the CP length is at least greater than or equal to the sum of the RTD and the maximum delay spread. In this way, after the base station that receives the uplink data frame removes the CP, it may be ensured that uplink data of multiple terminal devices is aligned, and signaling procedures such as random access, establishment of an RRC connection, and uplink synchronization can be omitted, so that the terminal device can directly send the uplink data packet by performing signaling exchange twice. This improves resource utilization, and reduces power consumption.

In a subsequent uplink data packet transmission process, the terminal device may perform neither step S602 nor step S604, that is, uplink data packet transmission can be implemented by performing only step S606 to step S614. When a time-frequency resource is periodically configured, or in duration of the time-frequency resource, step S606 may be further omitted, and the uplink data packet may be directly sent by performing step S608 to step S614, so that signaling exchange in the uplink transmission process is further reduced. This improves resource utilization, and reduces power consumption.

It should be noted that in the embodiments of FIG. 4 to FIG. 6, optionally, after the base station receives the uplink data frame sent by the terminal device, the base station returns an answer message to the terminal device, and the terminal device may determine, according to the answer message, whether the uplink data packet needs to be retransmitted. The base station and the terminal device may perform steps that are similar to step S312 to step S316 in FIG. 3, and details are not repeated herein.

Figure 7:
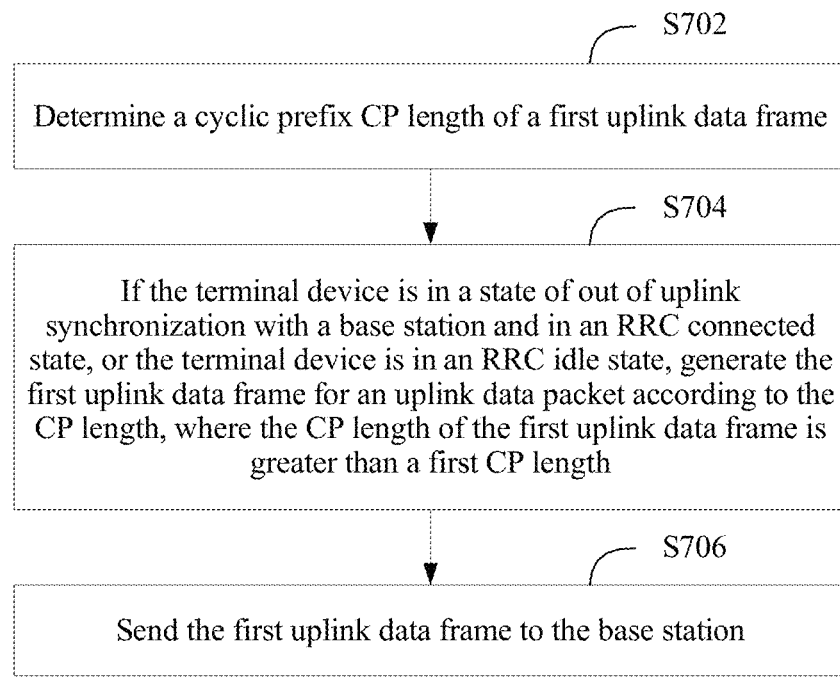
FIG. 7 is a flowchart of an uplink data packet transmission method according to an embodiment of the present disclosure.
Figure 8:
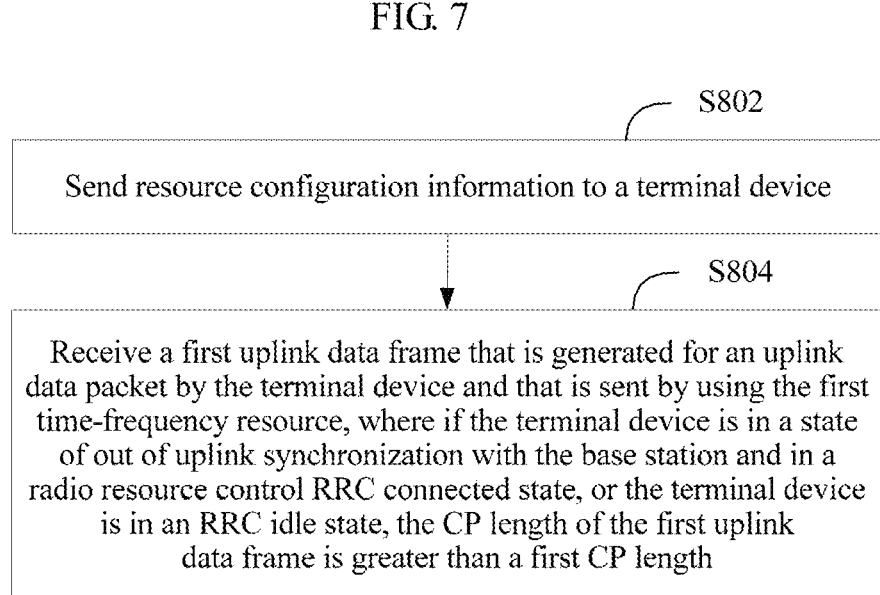
FIG. 8 is a flowchart of another uplink data packet transmission method according to an embodiment of the present disclosure.

FIG. 7 and FIG. 8 respectively show flowcharts of methods on a terminal device side and a base station side according to embodiments of the present disclosure. For an uplink data packet transmission method executed by the terminal device in FIG. 7, refer to descriptions about the terminal device in FIG. 3 to FIG. 6. For an uplink data packet transmission method executed by the base station In FIG. 8, refer to descriptions about the base station in FIG. 3 to FIG. 6.

As shown in FIG. 7, the method includes the following steps.

Step S702: The terminal device determines a CP length of a first uplink data frame.

For example, the terminal device receives CP length information sent by a base station, where the CP length information is used to indicate the CP length, so as to obtain the CP length of the first uplink data frame; or the terminal device receives RTD configuration information sent by the base station, and calculates the CP length according to the RTD configuration information, so as to obtain the CP length of the first uplink data frame.

Step S704: If the terminal device is in a state of out of uplink synchronization with the base station and in an RRC connected state, or the terminal device is in an RRC idle state, the terminal device generates the first uplink data frame for an uplink data packet according to the CP length, where the CP length of the first uplink data frame is greater than a first CP length, and the first CP length is a CP length of an uplink data frame sent by a terminal device that is in a state of uplink synchronization and in an RRC connected state.

Optionally, the CP length of the first uplink data frame is greater than or equal to a sum of a round-trip delay RTD between the terminal device and the base station and a maximum delay spread.

Optionally, the first uplink data frame further includes a GT.

Step S706: The terminal device sends the first uplink data frame to the base station.

Therefore, according to the uplink data packet transmission method in the present disclosure, if the terminal device is in the state of out of uplink synchronization and in the RRC connected state, or is in the RRC idle state, the terminal device obtains the CP length of the uplink data frame, generates the uplink data frame according to the CP length accordingly, and sends the uplink data frame. The CP length is greater than the CP length of the uplink data frame sent by the terminal device that is in the state of uplink synchronization and in the RRC connected state. For example, the CP length is at least greater than or equal to the sum of the RTD and the maximum delay spread. In this way, after the base station that receives the uplink data frame removes the CP, it may be ensured that uplink data of multiple terminal devices is aligned, and signaling procedures such as random access and uplink synchronization can be omitted, so that the terminal device can directly send the uplink data packet by performing signaling exchange once. This improves resource utilization, and reduces power consumption.

Optionally, before step S706, the method may further include: receiving, by the terminal device, resource configuration information sent by the base station, where the resource configuration information is used to indicate a first time-frequency resource allocated for the terminal device by the base station to transmit the uplink data packet. Optionally, if the first time-frequency resource is a common resource, the first uplink data frame carries identity information of the terminal device. For example, if the terminal device is in the RRC connected state, the identity information includes a C-RNTI; or if the terminal device is in an RRC idle state, the identity information includes a TMSI or an IMSI.

If the terminal device is in a state of uplink synchronization and the first time-frequency resource is a common resource, the terminal device generates a second uplink data frame for the uplink data packet, where a CP length of the second uplink data frame is equal to the first CP length.

Optionally, after step S706, the method may further include:

receiving, by the terminal device, an answer message sent by the base station, and determining, according to the answer message, whether the uplink data packet needs to be retransmitted; and if the terminal device determines that the uplink data packet needs to be retransmitted, generating, by the terminal device, a third uplink data frame according to the CP length, and sending the third uplink data frame to the base station.

Optionally, if the first time-frequency resource is a common resource, the answer message includes the identity information of the terminal device. For example, if the terminal device is in the RRC connected state, the identity information includes the C-RNTI; or if the terminal device is in an RRC idle state, the identity information includes the TMSI or the IMSI.

Optionally, before step S702, the method further includes:
sending, by the terminal device, capability information to the base station, where the capability information is used to indicate that the terminal device supports generating of an uplink data frame according to the CP length. For example, the terminal device receives a capability inquiry message sent by the base station, and returns the capability information to the base station.

Optionally, before the terminal device generates the first uplink data frame, the method further includes:
if the terminal device is in the state of out of uplink synchronization and in the RRC connected state, or the terminal device is in the RRC idle state, generating, by the terminal device, an uplink SR frame according to the CP length; and
sending, by the terminal device, the uplink SR frame to the base station.

Optionally, before the terminal device generates the first uplink data frame, the method further includes:
if the terminal device is in the state of out of uplink synchronization and in the RRC connected state, or the terminal device is in the RRC idle state, generating, by the terminal device, an uplink BSR frame according to the CP length; and
sending, by the terminal device, the uplink BSR frame to the base station.

As shown in FIG. 8, the method includes the following steps.

Step S802: A base station sends resource configuration information to a terminal device, where the resource configuration information is used to indicate a first time-frequency resource allocated for the terminal device by the base station to transmit an uplink data packet.

Optionally, if the first time-frequency resource is a common resource, a first uplink data frame carries identity information of the terminal device. For example, if the terminal device is in an RRC connected state, the identity information includes a C-RNTI; or if the terminal device is in an RRC idle state, the identity information includes a TMSI or an IMSI.

Step S804: The base station receives a first uplink data frame that is generated for an uplink data packet by the terminal device and that is sent by using the first time-frequency resource, where if the terminal device is in a state of out of uplink synchronization with the base station and in an RRC connected state, or the terminal device is in an RRC idle state, a CP length of the first uplink data frame is greater than a first CP length, and the first CP length is a CP length of an uplink data frame sent by a terminal device that is in a state of uplink synchronization and in an RRC connected state.

Optionally, the CP length of the first uplink data frame is greater than or equal to a sum of a round-trip delay RTD between the terminal device and the base station and a maximum delay spread.

Optionally, the first uplink data frame further includes a guard time GT.

Therefore, according to the uplink data packet transmission method in the present disclosure, if the terminal device is in the state of out of uplink synchronization and in the RRC connected state, or is in the RRC idle state, the CP length of the uplink data frame received by the base station is greater than the CP length of the uplink data frame sent by the terminal device that is in the state of uplink synchronization and in the RRC connected state. For example, the CP length is at least greater than or equal to the sum of the RTD and the maximum delay spread. In this way, after the base station that receives the uplink data frame removes the CP, it may be ensured that uplink data of multiple terminal devices is aligned, and signaling procedures such as random access and uplink synchronization can be omitted, so that the terminal device can directly send the uplink data packet by performing signaling exchange once. This improves resource utilization, and reduces power consumption.

Optionally, before step S802, the method further includes:
determining, by the base station, the CP length, and sending, to the terminal device, CP length information used to indicate the CP length; or sending, by the base station, RTD configuration information to the terminal device, so that the terminal device calculates the CP length according to the RTD configuration information.

Optionally, after the base station receives the first uplink data frame, the method further includes:
sending, by the base station, an answer message to the terminal device, so that the terminal device determines, according to the answer message, whether the uplink data packet needs to be retransmitted.

Optionally, if the first time-frequency resource is a common resource, the answer message includes the identity information of the terminal device. For example, if the terminal device is in an RRC connected state, the identity information includes the C-RNTI; or if the terminal device is in an RRC idle state, the identity information includes the TMSI or the IMSI.

Optionally, before step S802, the method further includes:
receiving, by the base station, capability information sent by the terminal device, where the capability information is used to indicate that the terminal device supports generating of an uplink data frame according to the CP length.

Optionally, before the base station receives the first uplink data frame, the method further includes:
receiving, by the base station, an uplink SR frame sent by the terminal device, where if the terminal device is in a state of out of uplink synchronization and in an RRC connected state, or the terminal device is in an RRC idle state, the uplink SR frame is generated by the terminal device according to the CP length.

Optionally, before the base station receives the first uplink data frame, the method further includes:
receiving, by the base station, an uplink BSR frame sent by the terminal device, where if the terminal device is in a state of out of uplink synchronization and in an RRC connected state, or the terminal device is in an RRC idle state, the uplink BSR frame is generated by the terminal device according to the CP length.

Figure 9:
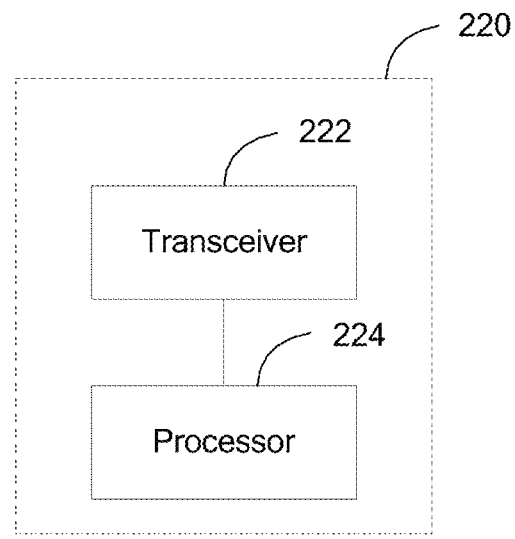
FIG. 9 is a schematic diagram of a terminal device according to an embodiment of the present disclosure.

FIG. 9 is a schematic block diagram of a terminal device (for example, the terminal device 220 in FIG. 2) according to an embodiment of the present disclosure. The terminal device in FIG. 9 may perform operations performed by the terminal device in the embodiments of FIG. 3 to FIG. 6. As described above, the terminal device 220 may include a transceiver 222 and a processor 224.

The processor 224 is configured to determine a CP length of a first uplink data frame. If the terminal device is in a state of out of uplink synchronization with a base station and in an RRC connected state, or the terminal device is in an RRC idle state, the processor 224 is further configured to generate the first uplink data frame for an uplink data packet according to the CP length. The CP length of the first uplink data frame is greater than a first CP length, and the first CP length is a CP length of an uplink data frame sent by a terminal device that is in a state of uplink synchronization and in an RRC connected state.

The transceiver 222 is configured to send the first uplink data frame to the base station.

Optionally, the CP length of the first uplink data frame is greater than or equal to a sum of a round-trip delay RTD between the terminal device and the base station and a maximum delay spread.

Optionally, the first uplink data frame further includes a guard time GT.

Therefore, if the terminal device is in the state of out of uplink synchronization and in the RRC connected state, or is in the RRC idle state, the terminal device obtains the CP length of the uplink data frame, generates the uplink data frame according to the CP length accordingly, and sends the uplink data frame. The CP length is greater than the CP length of the uplink data frame sent by the terminal device that is in the state of uplink synchronization and in an RRC connected state. For example, the CP length is at least greater than or equal to the sum of the RTD and the maximum delay spread. In this way, after the base station that receives the uplink data frame removes the CP, it may be ensured that uplink data of multiple terminal devices is aligned, and signaling procedures such as random access and uplink synchronization can be omitted, so that the terminal device can directly send the uplink data packet by performing signaling exchange once. This improves resource utilization, and reduces power consumption.

Optionally, the transceiver 222 is further configured to receive CP length information sent by the base station, where the CP length information is used to indicate the CP length; or the transceiver 222 is further configured to receive RTD configuration information sent by the base station, and the processor 224 is configured to calculate the CP length according to the RTD configuration information.

Optionally, the transceiver 222 is configured to receive resource configuration information sent by the base station, where the resource configuration information is used to indicate a first time-frequency resource allocated for the terminal device by the base station to transmit the uplink data packet. If the first time-frequency resource is a common resource, the first uplink data frame carries identity information of the terminal device. For example, if the terminal device is in an RRC connected state, the identity information includes a C-RNTI; or if the terminal device is in an RRC idle state, the identity information includes a TMSI or an IMSI.

Optionally, if the terminal device is in a state of uplink synchronization and the first time-frequency resource is a common resource, the processor 224 generates a second uplink data frame for the uplink data packet, where a CP length of the second uplink data frame is equal to the first CP length.

Optionally, the transceiver 222 is further configured to receive an answer message sent by the base station, and the processor 224 is configured to determine, according to the answer message, whether the uplink data packet needs to be retransmitted. If the processor 224 determines that the uplink data packet needs to be retransmitted, the processor 224 is configured to generate a third uplink data frame according to the CP length, and the transceiver 222 is configured to send the third uplink data frame to the base station. If the first time-frequency resource is a common resource, the answer message includes the identity information of the terminal device. For example, if the terminal device is in an RRC connected state, the identity information includes a C-RNTI; or if the terminal device is in an RRC idle state, the identity information includes a TMSI or an IMSI.

Optionally, the transceiver 222 is further configured to send capability information to the base station, where the capability information is used to indicate that the terminal device supports generating of an uplink data frame according to the CP length. For example, the transceiver 222 is configured to receive a capability inquiry message sent by the base station, and is configured to return the capability information to the base station.

Optionally, before the transceiver 222 sends the first uplink data frame, if the terminal device is in a state of out of uplink synchronization and in an RRC connected state, or the terminal device is in an RRC idle state, the processor 224 is configured to generate an uplink SR frame according to the CP length, and the transceiver 222 is further configured to send the uplink SR frame to the base station.

Optionally, before the transceiver 222 sends the first uplink data frame, if the terminal device is in a state of out of uplink synchronization and in an RRC connected state, or the terminal device is in an RRC idle state, the processor 224 is configured to generate an uplink BSR frame according to the CP length, and the transceiver 222 is further configured to send the uplink BSR frame to the base station.

Figure 10:
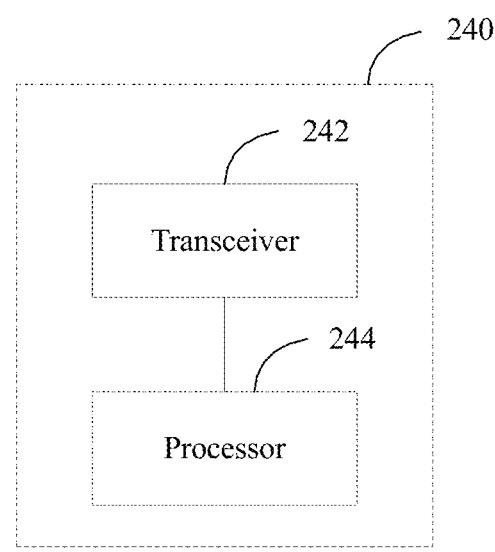
FIG. 10 is a schematic diagram of a base station according to an embodiment of the present disclosure.

FIG. 10 is a schematic block diagram of a base station (for example, the base station 240 in FIG. 2) according to an embodiment of the present disclosure. The base station in FIG. 10 may perform operations performed by the base station in each embodiment of FIG. 3 to FIG. 6. As described above, the base station 240 includes at least a transceiver 242. The transceiver 242 may also be implemented by a transmitter and a receiver separately.

The transmitter is configured to send resource configuration information to a terminal device, where the resource configuration information is used to indicate a first time-frequency resource allocated for the terminal device by the base station to transmit an uplink data packet.

The receiver is configured to receive a first uplink data frame that is generated for the uplink data packet by the terminal device and that is sent by using the first time-frequency resource, where if the terminal device is in a state of out of uplink synchronization with the base station and in an RRC connected state, or the terminal device is in an RRC idle state, a CP length of the first uplink data frame is greater than a first CP length, and the first CP length is a CP length of an uplink data frame sent by a terminal device that is in a state of uplink synchronization and in an RRC connected state.

Optionally, the CP length of the first uplink data frame is greater than or equal to a sum of a round-trip delay RTD between the terminal device and the base station and a maximum delay spread.

Optionally, the first uplink data frame further includes a guard time GT.

Therefore, if the terminal device is in the state of out of uplink synchronization and in the RRC connected state, or is in the RRC idle state, the CP length of the uplink data frame received by the base station is greater than the CP length of the uplink data frame sent by the terminal device that is in the state of uplink synchronization and in the RRC connected state. For example, the CP length is at least greater than or equal to the sum of the RTD and the maximum delay spread. In this way, after the base station that receives the uplink data frame removes the CP, it may be ensured that uplink data of multiple terminal devices is aligned, and signaling procedures such as random access and uplink synchronization can be omitted, so that the terminal device can directly send the uplink data packet by performing signaling exchange once. This improves resource utilization, and reduces power consumption.

Optionally, the base station 240 further includes a processor 244.

Optionally, the processor 244 is configured to determine the CP length, and the transmitter is further configured to send, to the terminal device, CP length information used to indicate the CP length; or the transmitter is further configured to send RTD configuration information to the terminal device, so that the terminal device calculates the CP length according to the RTD configuration information.

Optionally, if the first time-frequency resource is a common resource, the first uplink data frame carries identity information of the terminal device. For example, if the terminal device is in an RRC connected state, the identity information includes a C-RNTI; or if the terminal device is in an RRC idle state, the identity information includes a TMSI or an IMSI.

Optionally, the transmitter is further configured to send an answer message to the terminal device, so that the terminal device determines, according to the answer message, whether the uplink data packet needs to be retransmitted. If the first time-frequency resource is a common resource, the answer message includes the identity information of the terminal device. For example, if the terminal device is in an RRC connected state, the identity information includes the C-RNTI; or if the terminal device is in an RRC idle state, the identity information includes the TMSI or the IMSI.

Optionally, the receiver is further configured to receive capability information sent by the terminal device, where the capability information is used to indicate that the terminal device supports generating of an uplink data frame according to the CP length.

Optionally, before the receiver receives the first uplink data frame, the receiver is further configured to receive an uplink SR frame sent by the terminal device, where if the terminal device is in a state of out of uplink synchronization and in an RRC connected state, or the terminal device is in an RRC idle state, the uplink SR frame is generated by the terminal device according to the CP length.

Optionally, before the receiver receives the first uplink data frame, the receiver is further configured to receive an uplink BSR frame sent by the terminal device, where if the terminal device is in a state of out of uplink synchronization and in an RRC connected state, or the terminal device is in an RRC idle state, the uplink BSR frame is generated by the terminal device according to the CP length.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division, or may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An uplink data packet transmission method, comprising:
   determining, by a terminal device, a cyclic prefix (CP) length of a first uplink data frame;
   when the terminal device is in a state of out of uplink synchronization with a base station and in a radio resource control (RRC) connected state, or the terminal device is in an RRC idle state, generating, by the terminal device, an uplink buffer status report (BSR) frame according to the CP length;
   sending, by the terminal device, the uplink BSR frame to the base station; and
   generating, by the terminal device, the first uplink data frame for an uplink data packet according to the CP length, wherein the CP length of the first uplink data frame is greater than a first CP length, and the first CP length is a CP length of an uplink data frame sent by another terminal device that is in a state of uplink synchronization and in an RRC connected state; and
   sending, by the terminal device, the first uplink data frame to the base station.

2. The uplink data packet transmission method according to claim 1, wherein the CP length of the first uplink data frame is greater than or equal to a sum of a round-trip delay (RTD) between the terminal device and the base station and a maximum delay spread.

3. The uplink data packet transmission method according to claim 1, wherein the determining, by the terminal device, the CP length of the first uplink data frame comprises at least one of the following:
   (a) receiving, by the terminal device, CP length information from the base station, wherein the CP length information is used to indicate the CP length; and
   (b) receiving, by the terminal device, RTD configuration information from the base station, and obtaining the CP length according to the round-trip delay (RTD) configuration information.

4. The uplink data packet transmission method according to claim 1, wherein the method further comprises:
   receiving, by the terminal device, resource configuration information from the base station, wherein the resource configuration information is used to indicate a first time-frequency resource allocated for the terminal device by the base station to transmit the uplink data packet.

5. The uplink data packet transmission method according to claim 4, wherein the method further comprises:
   when the terminal device is in a state of uplink synchronization, and the first time-frequency resource is a common resource, generating, by the terminal device, a second uplink data frame for the uplink data packet, wherein a CP length of the second uplink data frame is equal to the first CP length.

6. The uplink data packet transmission method according to claim 4, wherein when the first time-frequency resource is a common resource, the first uplink data frame carries identity information of the terminal device.

7. The uplink data packet transmission method according to claim 4, wherein after the sending, by the terminal device, the first uplink data frame to the base station, the method further comprises:
   receiving, by the terminal device, an answer message from the base station, and determining, according to the answer message, whether the uplink data packet needs to be retransmitted; and
   when the terminal device determines that the uplink data packet needs to be retransmitted, generating, by the terminal device, a third uplink data frame according to the CP length, and sending the third uplink data frame to the base station.

8. The uplink data packet transmission method according to claim 7, wherein when the first time-frequency resource is a common resource, the answer message comprises identity information of the terminal device.

9. The uplink data packet transmission method according to claim 6, wherein when the terminal device is in an RRC connected state, the identity information comprises a cell radio network temporary identifier (C-RNTI); or when the terminal device is in an RRC idle state, the identity information comprises a temporary mobile subscriber identity (TMSI) or an international mobile subscriber identity (IMSI).

10. The uplink data packet transmission method according to claim 1, wherein the method further comprises:

sending, by the terminal device, capability information to the base station, wherein the capability information is used to indicate that the terminal device supports generating of an uplink data frame according to the CP length.

11. The uplink data packet transmission method according to claim 10, wherein the sending, by the terminal device, the capability information to the base station comprises:
receiving, by the terminal device, a capability inquiry message from the base station, and returning the capability information to the base station.

12. The uplink data packet transmission method according to claim 1, wherein the first uplink data frame further comprises a guard time (GT).

13. The uplink data packet transmission method according to claim 1, wherein before the generating, by the terminal device, the first uplink data frame, the method further comprises:
when the terminal device is in the state of out of uplink synchronization and in the RRC connected state, or the terminal device is in the RRC idle state, generating, by the terminal device, an uplink scheduling request (SR) frame according to the CP length; and
sending, by the terminal device, the uplink SR frame to the base station.

14. A terminal device, comprising:
a processor, configured to determine a cyclic prefix (CP) length of a first uplink data frame, wherein when the terminal device is in a state of out of uplink synchronization with a base station and in a radio resource control (RRC) connected state, or the terminal device is in an RRC idle state, the processor is configured to generate, by the terminal device, an uplink buffer status report (BSR) frame according to the CP length; send, by the terminal device, the uplink BSR frame to the base station; and generate the first uplink data frame for an uplink data packet according to the CP length, wherein the CP length of the first uplink data frame is greater than a first CP length, and the first CP length is a CP length of an uplink data frame sent by another terminal device that is in a state of uplink synchronization and in an RRC connected state; and
a transceiver, configured to send the first uplink data frame to the base station.

15. The terminal device according to claim 14, wherein the CP length of the first uplink data frame is greater than or equal to a sum of a round-trip delay (RTD) between the terminal device and the base station and a maximum delay spread.

16. The terminal device according to claim 14, wherein the transceiver is configured to implement one of the following:
(a) receiving CP length information from the base station, wherein the CP length information is used to indicate the CP length; and
(b) receiving round-trip delay (RTD) configuration information from the base station, and wherein the processor is configured to obtain the CP length according to the RTD configuration information.

17. The terminal device according to claim 14, wherein the transceiver is configured to receive resource configuration information from the base station, and the resource configuration information is used to indicate a first time-frequency resource allocated for the terminal device by the base station to transmit the uplink data packet.

18. The terminal device according to claim 17, wherein when the terminal device is in a state of uplink synchronization, and the first time-frequency resource is a common resource, the processor is configured to generate a second uplink data frame for the uplink data packet, wherein a CP length of the second uplink data frame is equal to the first CP length.

19. A non-transitory computer-readable media storing computer instructions for execution by one or more processors, wherein the computer instructions instruct the one or more processors to perform operations including:
determining a cyclic prefix (CP) length of a first uplink data frame;
when a terminal device is in a state of out of uplink synchronization with a base station and in a radio resource control (RRC) connected state, or the terminal device is in an RRC idle state, generating an uplink buffer status report (BSR) frame according to the CP length;
sending the uplink BSR frame to the base station; and
generating the first uplink data frame for an uplink data packet according to the CP length, wherein the CP length of the first uplink data frame is greater than a first CP length, and the first CP length is a CP length of an uplink data frame sent by another terminal device that is in a state of uplink synchronization and in an RRC connected state; and
sending the first uplink data frame to the base station.

* * * * *